(12) United States Patent
Huang et al.

(10) Patent No.: US 7,230,837 B1
(45) Date of Patent: Jun. 12, 2007

(54) METHOD AND CIRCUIT FOR CASCADED PULSE WIDTH MODULATION

(75) Inventors: Qin Huang, Cary, NC (US); Abdel-Aty Edris, Sunnyvale, CA (US); Michael R. Ingram, Harrison, TN (US); Siriroj Sirisukprasert, Bangkok (TH)

(73) Assignees: North Carolina State University, Raleigh, NC (US); Tennessee Valley Authority, Knoxville, TN (US); Electrical Power Research Institute, Inc., Palo Alto, CA (US)

( * ) Notice: Subject to any disclaimer, the term of this patent is extended or adjusted under 35 U.S.C. 154(b) by 0 days.

(21) Appl. No.: 11/277,594

(22) Filed: Mar. 27, 2006

(51) Int. Cl.
*H02M 7/521* (2006.01)
*H02J 1/14* (2006.01)
(52) U.S. Cl. .......................... 363/71; 363/98; 327/175
(58) Field of Classification Search .................. 363/65, 363/71, 98; 323/283; 327/172, 175, 176, 327/182
See application file for complete search history.

(56) References Cited

U.S. PATENT DOCUMENTS

| | | | |
|---|---|---|---|
| 6,426,666 B1 | 7/2002 | Li et al. | |
| 6,519,169 B1 * | 2/2003 | Asplund et al. | 363/132 |
| 6,710,639 B2 | 3/2004 | Huang et al. | |
| 6,933,541 B1 | 8/2005 | Huang | |
| 6,934,458 B2 * | 8/2005 | Brown et al. | 385/140 |
| 6,995,592 B2 * | 2/2006 | Agarwal | 327/172 |
| 7,170,764 B2 * | 1/2007 | Vinciarelli | 363/65 |

* cited by examiner

*Primary Examiner*—Gary L Laxton
(74) *Attorney, Agent, or Firm*—Adams Evans P.A.

(57) ABSTRACT

A method of balancing the voltage of DC links in a cascaded multi-level converter (CMC) semiconductor circuit, including the steps of providing a plurality of H-bridge converters per phase in the CMC circuit and utilizing a three phase duty cycle value from the main controller to determine a normalized duty cycle value, a ceiling duty cycle value and a floor duty cycle value. The normalized duty cycle value and an output current of the CMC is used to determine the direction and polarity of a capacitor current, and utilizing the capacitor current to determine a plurality of output capacitor voltages. A voltage summation result and direction is obtained from a ceiling index pointer and a floor index pointer and the voltage summation result, direction from the ceiling index pointer and a floor index pointer are used to create a combined switching table for the H-bridge converters. A pulse width modulator is utilized to balance the voltage of the DC links and thereby eliminate DC-capacitor voltage imbalance.

12 Claims, 13 Drawing Sheets

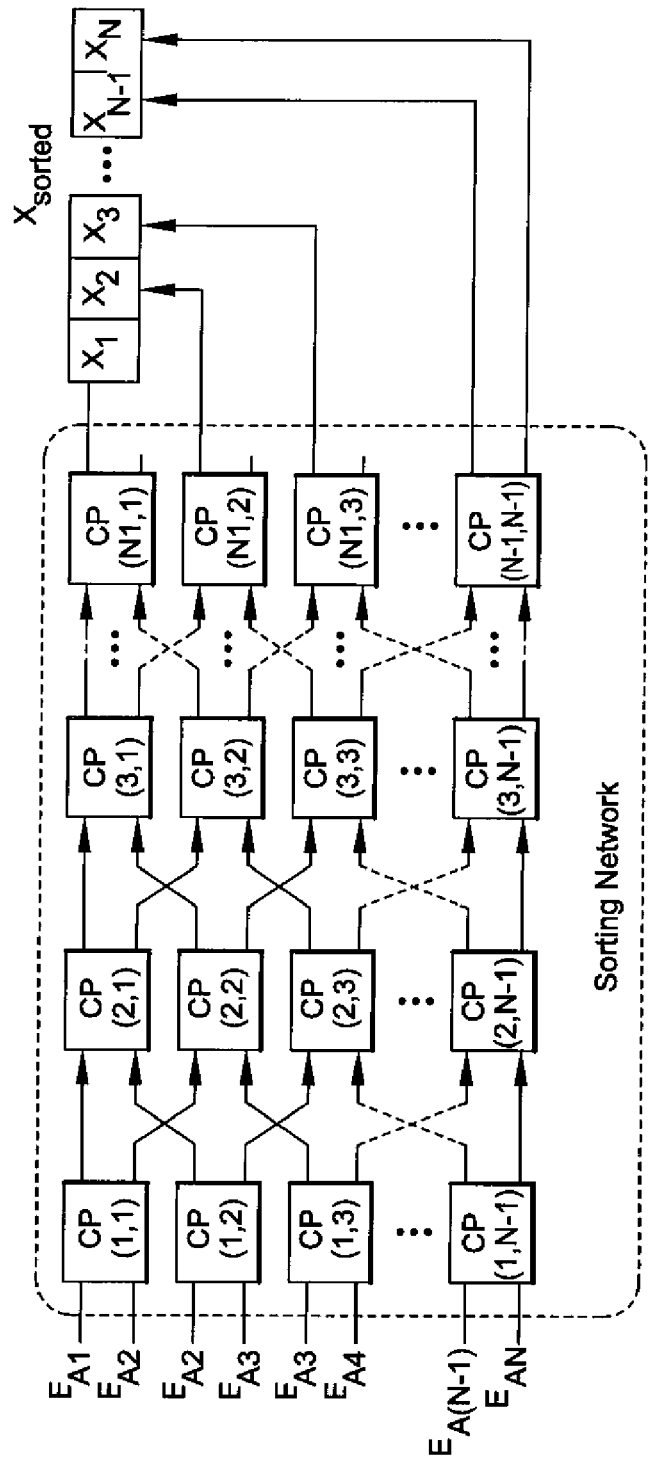
Fig. 7
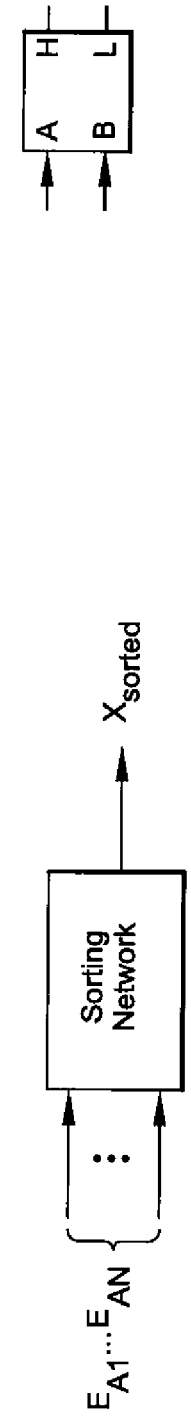
Fig. 8
Fig. 6

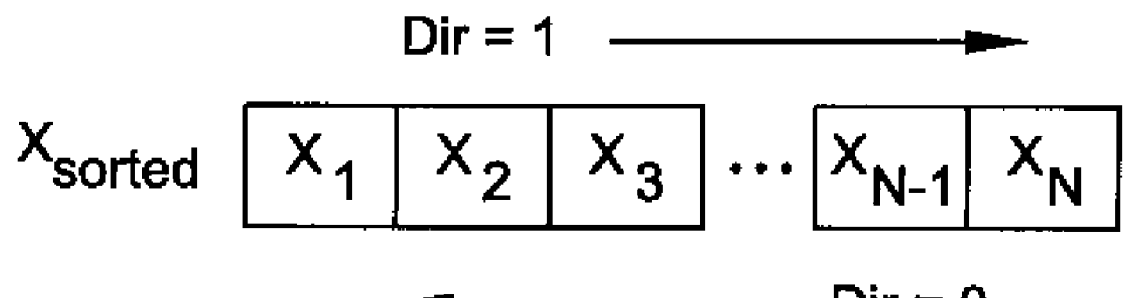
(a)
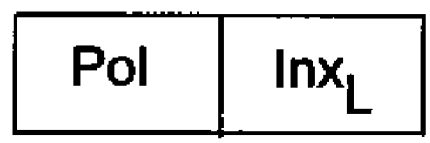
(b)
Fig. 12

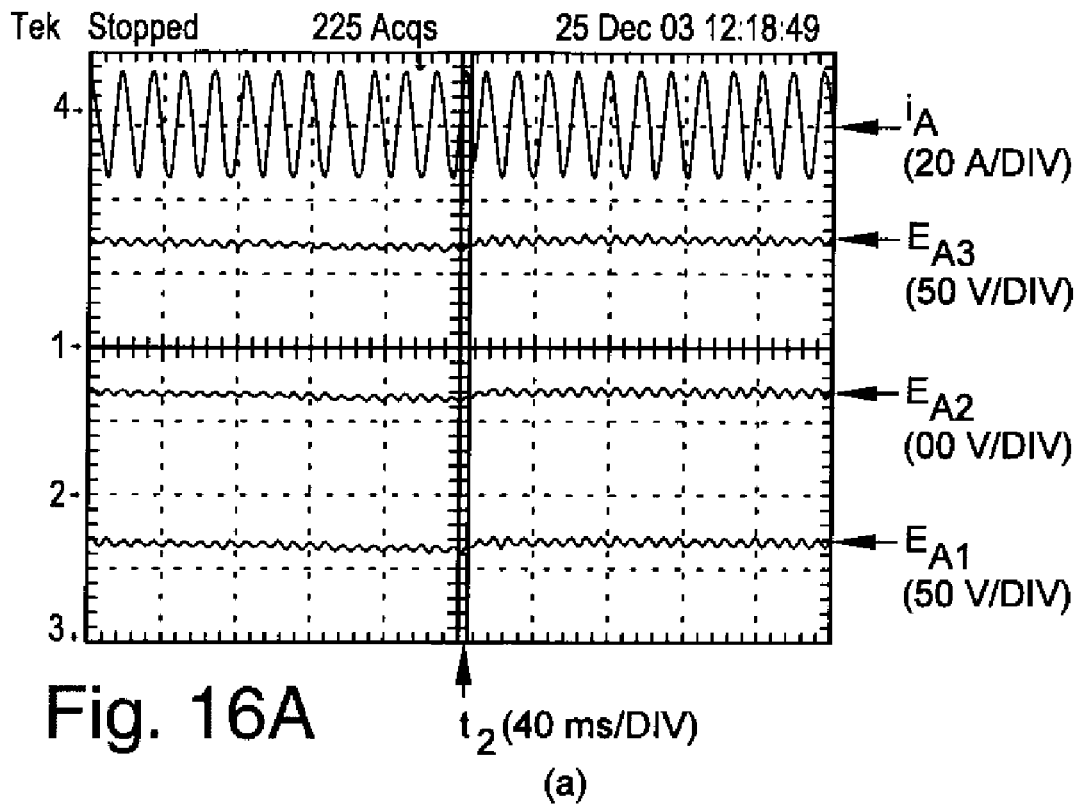
Fig. 16A  $t_2$(40 ms/DIV)
(a)
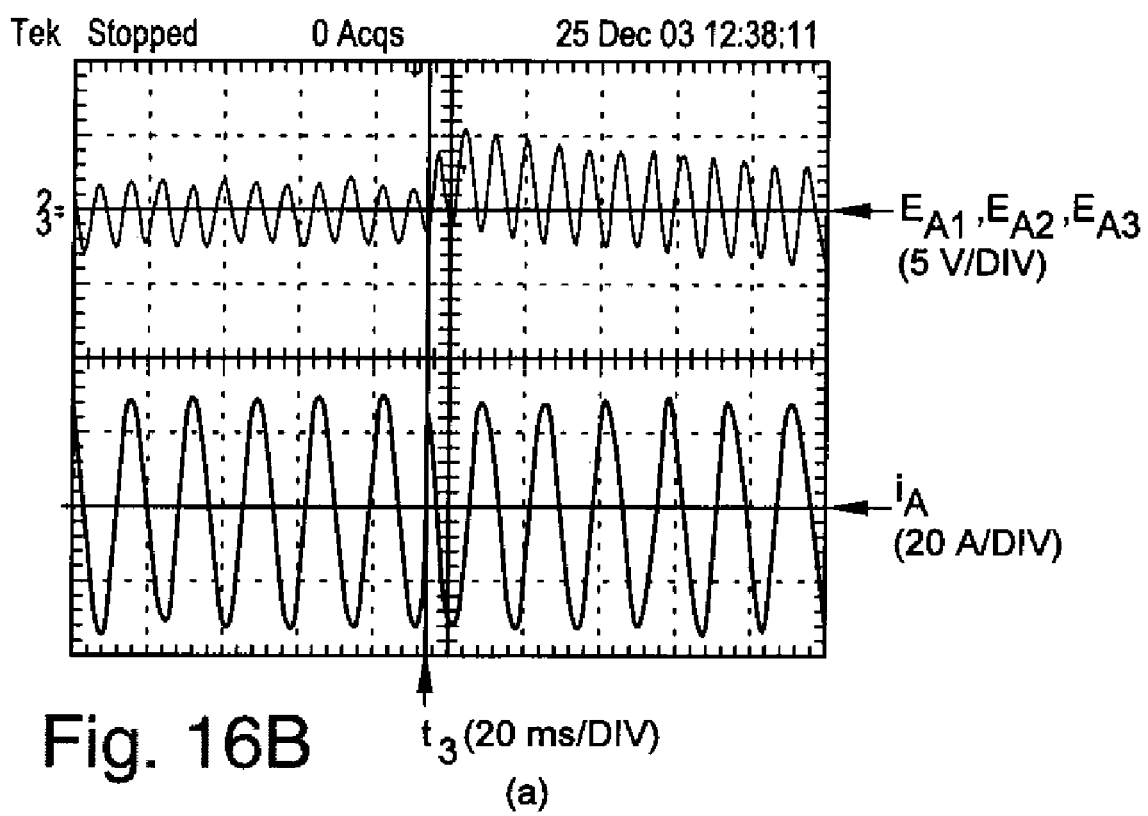
Fig. 16B  $t_3$(20 ms/DIV)
(a)

METHOD AND CIRCUIT FOR CASCADED PULSE WIDTH MODULATION

TECHNICAL FIELD AND BACKGROUND OF THE INVENTION

The present invention generally relates to the field of power electronics, and more particularly to a novel pulse width modulation (PWM) technique and circuit for balancing the voltage of DC links of a cascaded-multilevel converter (CMC) for reactive power compensations. The invention has application in, for example, electric power generation in Flexible Alternating Current Transmission systems (FACTS) and motor drives, and is useful in both active and reactive power generation.

The method and circuit described and claimed in this application can be implemented by hardware circuitry. Thus, the calculation time in the digital signal processor (DSP) is only slightly increased as more voltage levels are employed. The basic structure of the proposed technique is modular. Therefore, the method and circuit may be employed for any number of H-bridge converters. With these features, the complexity of the DSP programming for the control loop is not affected by increasing the number of voltage levels.

Prior art DC capacitor voltage-balancing techniques add individual DC voltage loops into the main control loop. The compensators of each individual loop, however, are very difficult to design because of the complexity of the voltage-loop transfer functions. Thus, trial and error evaluation and testing provides the simplest way to achieve a satisfactory compensator design. This process is very time-consuming. Moreover, the greater the number of voltage levels, the more complex the control design. The main controller, which is the DSP-based, must perform all of the feedback control steps. As a result, the prior art approach potentially reduces the reliability of the controller.

To overcome the disadvantages of prior art devices and methods, this application describes a new PWM technique, which is specially designed for CMC-based Static Synchronous Shunt Compensators (STATCOM). The PWM method is referred to as a "cascaded PWM", in which the DC capacitor voltages, the output currents and the three-phase multilevel duty cycle command are used as its inputs.

SUMMARY OF THE INVENTION

Therefore, it is an object of the invention to provide a pulse width modulation technique for balancing the voltage of DC links of a cascaded-multilevel converter for reactive power compensations.

It is another object of the invention to provide a pulse width modulation technique that can be implemented by hardware circuitry.

It is another object of the invention to provide a pulse width modulation technique that is modular.

It is another object of the invention to provide a pulse width modulation technique that may be employed for any number of H-bridge converters.

It is another object of the invention to provide a pulse width modulation technique wherein the complexity of control loop DSP programming is not affected by increasing the number of voltage levels.

These and other objects and advantages are achieved by providing a method of balancing the voltage of DC links in a cascaded multi-level converter (CMC) semiconductor circuit, comprising the steps of providing a plurality of H-bridge converters in the CMC circuit and utilizing a three phase duty cycle value from the main controller to determine a normalized duty cycle value, a ceiling duty cycle value and a floor duty cycle value. The normalized duty cycle value and an output current of the CMC is used to determine the direction and polarity of a capacitor current, and utilizing the capacitor current to determine a plurality of output capacitor voltages. The capacitor voltages are sorted to obtain a register representing sorted capacitor voltages, and the multi-level duty cycle voltage, the polarity of the duty cycle output voltage and the sorted capacitor voltages are input into an index generator. A ceiling index pointer and a floor index pointer are calculated wherein the ceiling index pointer corresponds to an input ceiling duty cycle representing a number of the plurality of H-bridge converters required to generate a positive output voltage, and the floor index pointer corresponds to an input floor duty cycle representing a number of the plurality of H-bridge converters required to generate a negative output voltage. A voltage summation result and direction are obtained from the ceiling index pointer, and a floor index pointer and the voltage summation result, direction from the ceiling index pointer and a floor index pointer are utilized to create a combined switching table for the H-bridge converters. A pulse width modulator is utilized to balance the voltage of the DC links and thereby eliminate DC-capacitor voltage imbalance.

According to one preferred embodiment of the invention, the step of determining the number of levels in the CMC is determined according to the formula 2N+1, where N is the number of H-bridge converters per phase in the CMC.

According to another preferred embodiment of the invention, the step of sorting the capacitor voltages comprises the step of sorting the capacitor voltages with a sorting algorithm.

According to another preferred embodiment of the invention, the sorting algorithm is a bubble sorting algorithm.

According to another preferred embodiment of the invention, the CMC comprises a cascaded seven level voltage source converter (VSC).

According to another embodiment of the invention, a method of balancing the voltage of DC links in a cascaded multi-level converter (CMC) semiconductor circuit, comprising the steps of providing a plurality of H-bridge converters in the CMC circuit, and utilizing a three phase command multilevel duty cycle value from the main controller to determine a normalized duty cycle value, a ceiling duty cycle value and a floor duty cycle value. The normalized duty cycle value and an output current of the CMC are utilized to determine the direction and polarity of the normalized duty cycle value and a capacitor current, and the capacitor current is used to determine a plurality of output capacitor voltages. The capacitor voltages are sorted to obtain a register containing a plurality of indices representing sorted capacitor voltages, and the multi-level duty cycle voltage, the direction and polarity of the duty cycle output voltage and the sorted capacitor voltages are input into an index generator. A ceiling index pointer and a floor index pointer calculated, wherein the ceiling index pointer corresponds to an input ceiling duty cycle representing a number of the plurality of H-bridge converters required to generate a positive output voltage, and the floor index pointer corresponds to an input floor duty cycle representing a number of the plurality of H-bridge converters required to generate a negative output voltage. A voltage summation result and direction are determined from the ceiling index pointer and a floor index pointer and used to create a combined switching table for the H-bridge converters. The pulse width modulator is used to balance the voltage of the DC links and thereby eliminate DC-capacitor voltage imbalance.

A circuit for balancing the voltage of DC links in a cascaded multi-level converter (CMC) comprises plurality of H-bridge converters, a main controller for utilizing a three phase duty cycle value to determine a normalized duty cycle value, a ceiling duty cycle value and a floor duty cycle value, and a direction and duty cycle check circuit utilizing the normalized duty cycle value and an output current of the CMC to determine the direction and polarity of a capacitor current, and utilizing the capacitor current to determine a plurality of output capacitor voltages. A sorting network circuit is provided for sorting the capacitor voltages to obtain a register representing sorted capacitor voltages. An index generator is provided for receiving the multi-level duty cycle voltage, the polarity of the duty cycle output voltage and the sorted capacitor voltages and calculating a ceiling index pointer and a floor index pointer wherein the ceiling index pointer corresponds to an input ceiling duty cycle representing a number of the plurality of H-bridge converters required to generate a positive output voltage, and the floor index pointer corresponds to an input floor duty cycle representing a number of the plurality of H-bridge converters required to generate a negative output voltage, determining therefrom a voltage summation result and direction from the ceiling index pointer and a floor index pointer, and utilizing the voltage summation result, direction from the ceiling index pointer and a floor index pointer to create a combined switching table for the H-bridge converters. A pulse width modulator is utilized to balance the voltage of the DC links and thereby eliminate DC-capacitor voltage imbalance.

According to one embodiment of the invention, the circuit comprises a field programmable gate array circuit (FPGA).

According to another embodiment of the invention, the number of levels in the CMC is equal to the number obtained using the formula 2N+1, where N is the number of H-bridge converters in the CMC.

According to yet another embodiment of the invention, the sorting network includes a sorting algorithm.

According to yet another embodiment of the invention, the sorting algorithm comprises a bubble sorting algorithm.

According to yet another embodiment of the invention the CMC comprises a cascaded seven level voltage source converter (VSC).

BRIEF DESCRIPTION OF THE DRAWINGS

Some of the objects of the invention have been set forth above. Other objects and advantages of the invention will appear as the invention proceeds when taken in conjunction with the following drawings, in which:

FIG. 6 is a diagram of the boundary and duty cycle block of FIG. 1, showing the input and output signals;

FIG. 7 is a diagram of a N-level sorting network according to a preferred embodiment of the invention;

FIG. 8 is a diagram of a comparator unit of the sorting network shown in FIG. 7, showing the inputs and output signals;

FIG. 12 is a block diagram illustrating the direction of the summation of the indices of the sorting network, and the final format of the generated index;

FIG. 16A is a waveform plot showing the transient from the full inductive to the full capacitive mode according to FIG. 15;

FIG. 16B shows the waveform plot of FIG. 16A in detail at time $t_3$;

DETAILED DESCRIPTION OF THE PREFERRED EMBODIMENT AND BEST MODE

Figure 1:
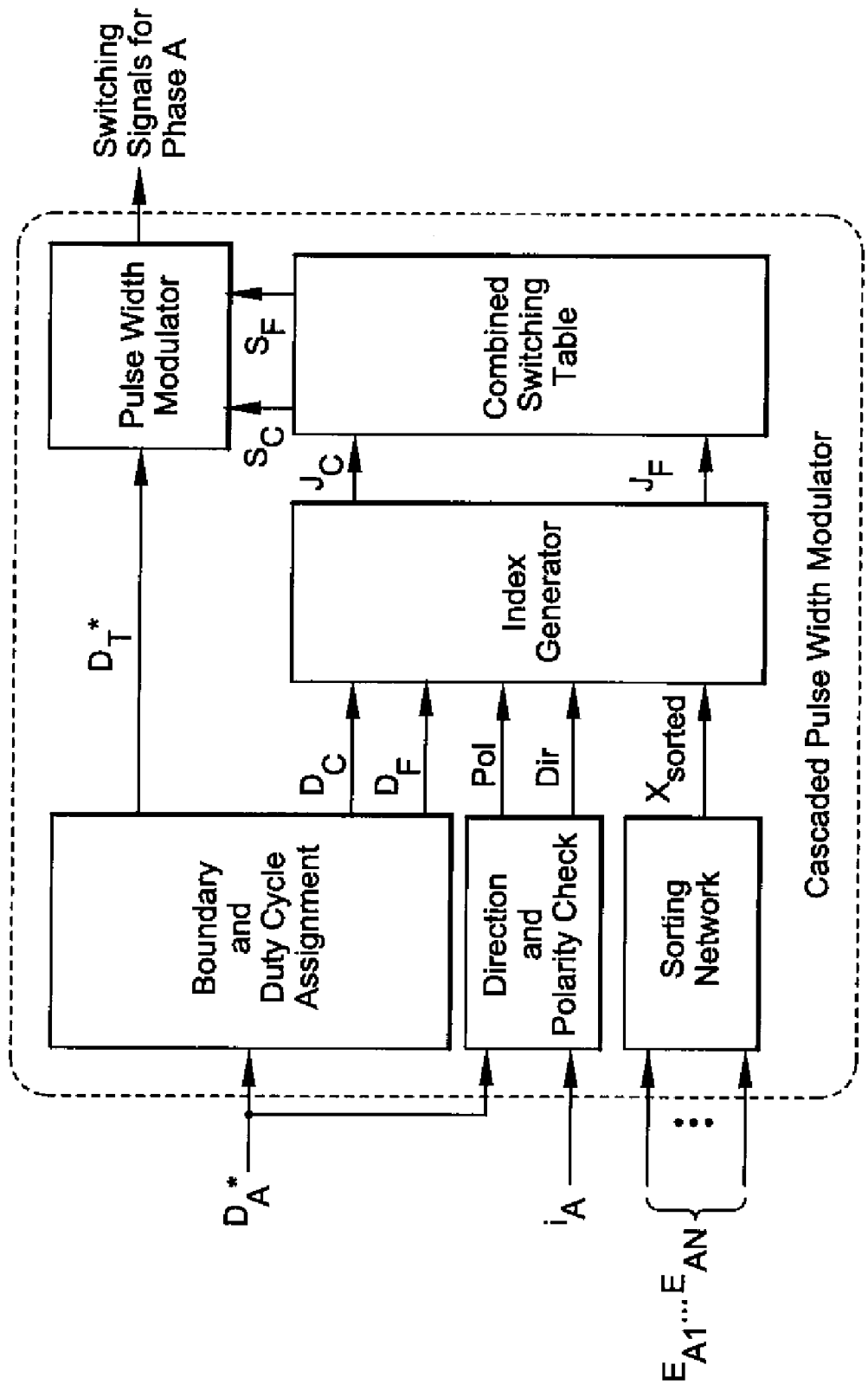
FIG. 1 is a block diagram of a cascaded pulse width modulator according to a preferred embodiment of the invention.

Referring now to the drawings, a preferred embodiment of a cascaded-PWM is shown in block diagram form is shown in FIG. 1. The FIG. 1 diagram includes blocks illustrating a boundary and duty cycle assignment, direction and polarity check, sorting network, index generator, combined switching table, and PWM method steps. These method steps can be designed and implemented by programmable integrated circuits such as a field programmable gate array circuit (FPGA) to arrive at a circuit operating according to the disclosure of this application.

Figure 2:
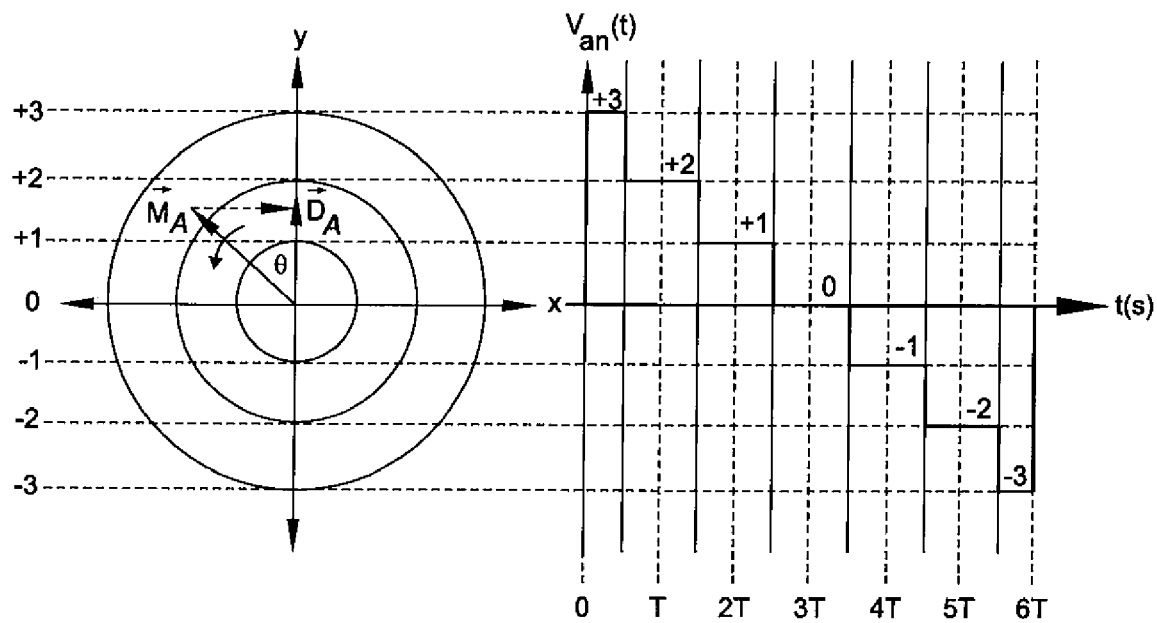
FIG. 2 is a diagram illustrating multilevel voltage synthesis of cascaded pulse width modulator as diagramed in FIG. 1.

For purposes of illustration, a cascaded seven-level voltage source converter (VSC) is used. Based on a formula 2N+1, each phase of the converter includes three identical H-bridge converters. Seven voltage levels, as shown in FIG. 2, can be synthesized, i.e., +3, +2, +1, 0, −1, −2, and −3. In the CMC, the relationship between the modulation index and the duty cycle can be expressed as follows:

$$D = M \cos(\omega t + \theta), \text{and} \qquad \text{Equation 1}$$

$$M = \frac{V_{pk}}{\sum_{j=1}^{N} E_j} \qquad \text{Equation 2}$$

where D is the duty cycle, M is the modulation index, $\omega$ is the angular velocity, $\theta$ is the displacement angle, $V_{pk}$ is the peak output voltage, $E_j$ is the $j^{th}$ DC-link voltage, and N is the number of H-bridge converters per phase.

From the plane shown in FIG. 2, vector $\vec{M}_A$ is defined as the phasor of the reference modulation index of the phase-A output voltage of the converter. In general, the modulation index for the CMC, as shown in Equation 2, is defined as a ratio of the converter output peak voltage to the total DC-link voltage. N is equal to 3 in the example shown in FIG. 2.

Phasor $\vec{M}_A$ rotates with the angular velocity of $\omega$ or $2\pi f$, where fjs the line frequency. From Equation I, the duty cycle phasor, $\vec{D}_A$, is basically the projection of $\vec{M}_A$ to the y-axis.

As is shown by continued reference to FIG. 2, the magnitude of $\vec{D}_A$ determines the levels of the synthesis voltages. Three circles on the xy plane shown in FIG. 2 represent the six different combinations of the levels of the synthesized voltage. The positive y is at the positive half cycle of the output voltage, whereas the negative y is at the negative half-cycle of the output voltage. For example, $\vec{M}_A$ is assumed to equal 2.34 and lays in the level between +2 and +3. At that moment, the vector $\vec{D}_A$, which represents the instantaneous output voltage of the converter, is equal to +1.50 in the boundary between the +1 and the +2.

Figure 3:
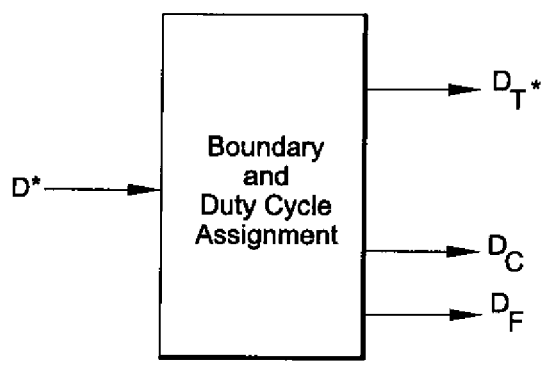
FIG. 3 is a diagram of the boundary and duty cycle block of FIG. 1, showing the input and output signals.

The boundary and duty cycle assignment (BDCA) block, see FIG. 3, is used to determine the level of the output voltage and the normalized duty cycle. The input of the BDCA block is the command multilevel duty cycle, $D_A^*$, from the main controller, and its outputs are the normalized duty cycle, $D_T^*$, the ceiling duty cycle, $D_C$, and the floor duty cycle, $D_F$. The duty cycles $D_C$ and $D_F$ are integers from 0 to N, where N is the number of H-bridge converters per phase. The relationship between duty cycles $D_C$ and $D_F$ is as follows:

$$D_F < D_C \text{ and } D_F = D_C - 1. \qquad \text{Equation 3}$$

The duty cycles $D_C$ and $D_F$ are determined from the duty cycle $D_A^*$ by the following relationship:

$$D_F < D_A^* < D_C. \qquad \text{Equation 4}$$

Then, the duty cycle $D_T^*$ can be calculated by $$D_T^* = D^* - D_F. \qquad \text{Equation 5}$$

Figure 4:
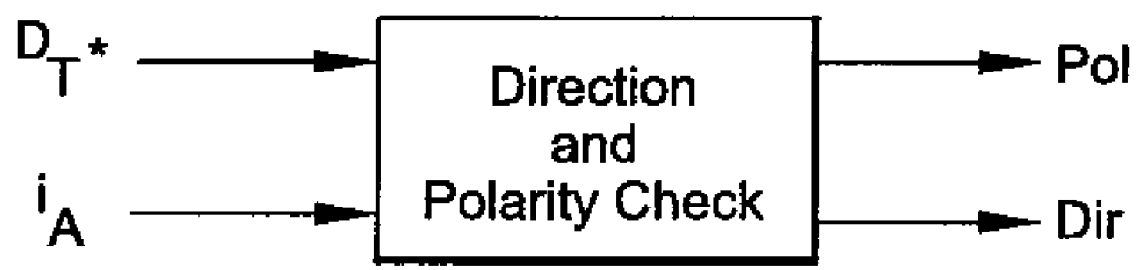
FIG. 4 is a diagram of the direction and polarity check block of FIG. 1, showing the input and output signals.

As is shown in FIG. 4, the direction and polarity check (DPC) block is used to determine the direction of the capacitor currents, as well as the polarity of the duty cycle. The inputs of the DPC block are the multilevel duty cycle $D_A^*$ and the output current of the converter. The outputs of the DPC blocks are the polarity of the duty cycle, Pol, and the direction of the capacitor current, Dir.

The polarity of the duty cycle, Pol, is defined as follows:

$$Pol = \begin{cases} 0, & \text{when } D_A^* < 0 \\ 1, & \text{when } D_A^* \geq 0 \end{cases} \qquad \text{Equation 6}$$

Figure 5:
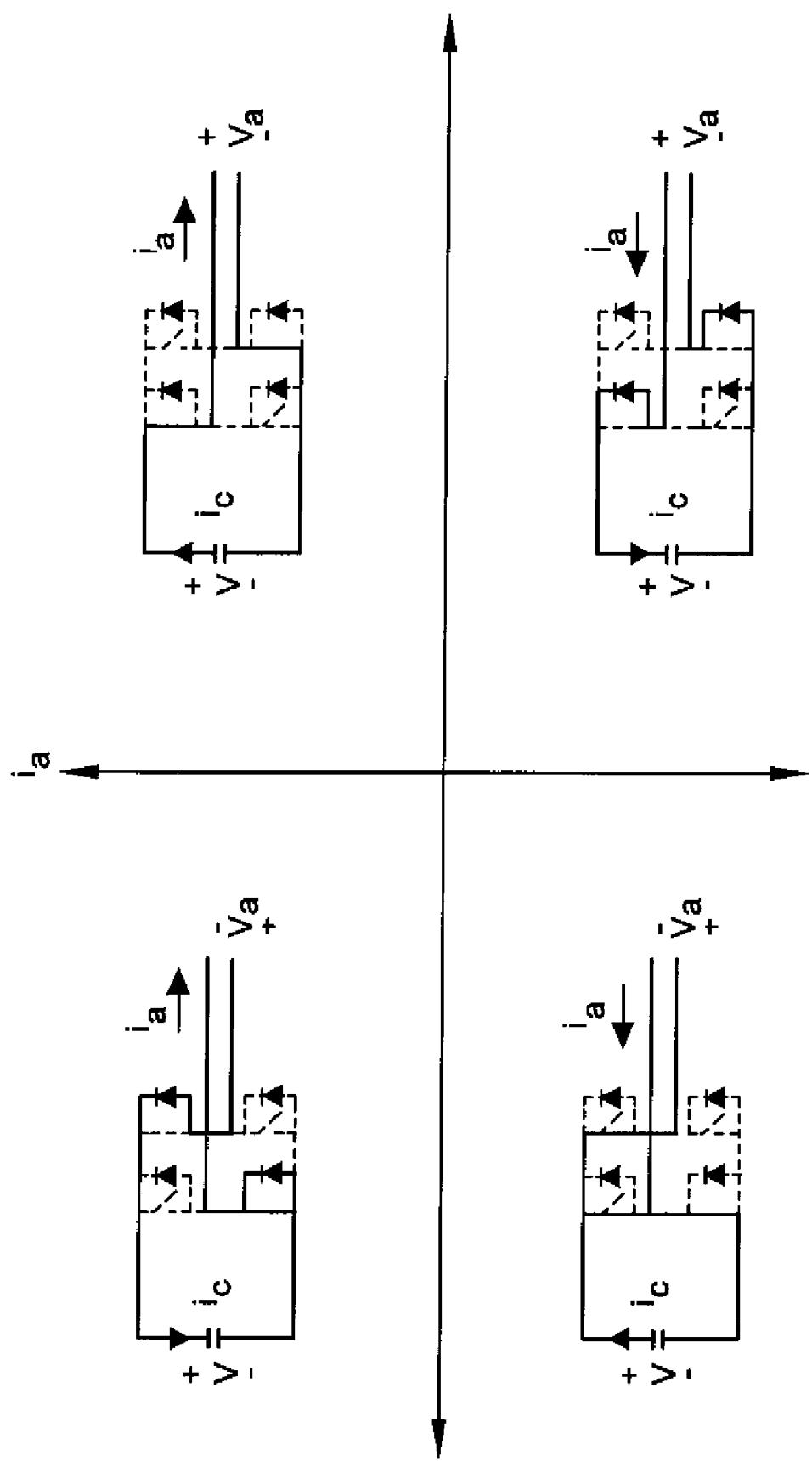
FIG. 5 is a diagram showing capacitor current in a four-quadrant operation of an H-bridge converter.

The direction of the capacitor current, Dir, is a function of the directions of the output voltage and current. FIG. 5 demonstrates the direction of the capacitor current in all four quadrants of the $I_a$–$V_a$ plane. The capacitor is discharged when the polarity of the current $I_a$ and voltage $V_a$ are the same, while the capacitor is charged when the polarity of the current $I_a$ and voltage $V_a$ are different. As a result to determine the direction of the capacitor current, the logic operator exclusive OR can be applied to the direction of the output voltage and current as follows:

$$\text{Dir} = \vec{i}_a \oplus \text{Pol}, \qquad \text{Equation 7}$$

where $\vec{i}_a$ is the direction of the output current, which equals 0 when flowing out of the converter and 1 when flowing into the converter, and Dir is the direction of the capacitor current, which equals 0 when discharged and 1 when charged.

Referring now to FIG. 6, the sorting network (SN), is used to perform descending sorting on the DC capacitor voltages. The inputs of the SN are N capacitor voltages in the same phase leg of the CMC. After sorting, the result is a register containing N indices, which represent the sorting information of the capacitor voltages. Among well-known sorting algorithms, a bubble sorting algorithm is particularly suitable because it is simple, and provides modularity and has a high fault tolerance.

The proposed SN for a general cascaded N-level converter is shown in FIG. 7. The basic unit of the SN is the comparator (CP). The CP block diagram is shown in FIG. 8, and its transfer function is as follows:

$$H = \max(a,b)$$

$$L = \min(a,b) \qquad \text{Equation 8}$$

where max is the maximum function, and min is the minimum function.

Figure 9:
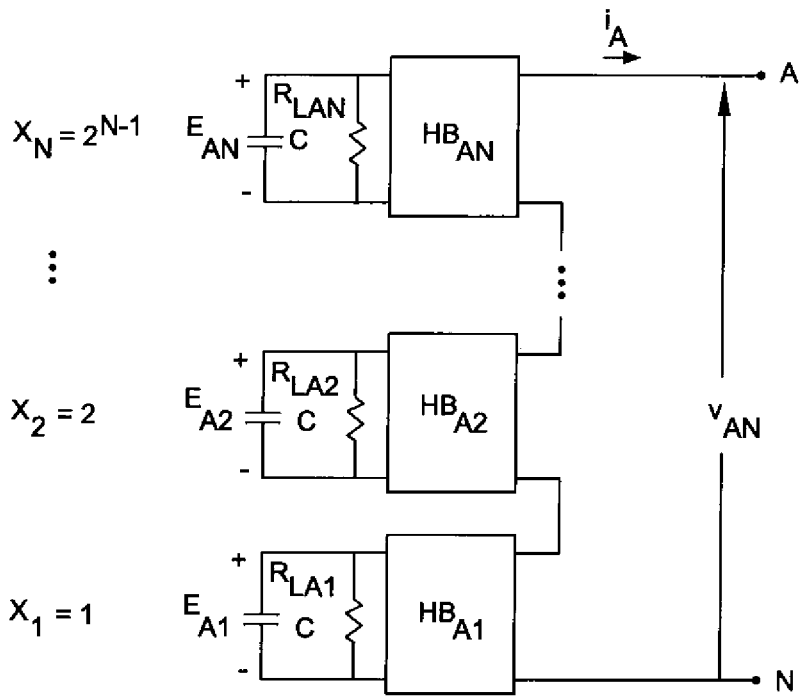
FIG. 9 is a diagram indicating the assignments of the embedded indices to represent the capacitor positions of the sorting network shown in FIG. 7.

The index X is the number representing the capacitor position in the phase leg, and is assigned as shown in FIG. 9.

Figure 10:
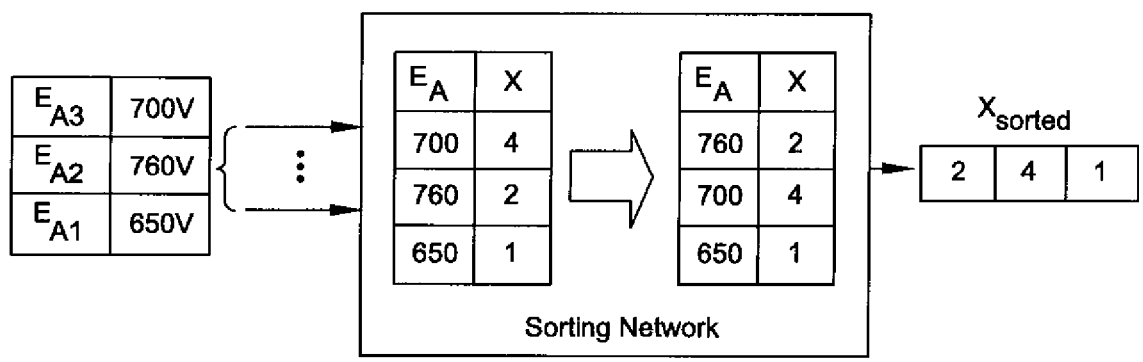
FIG. 10 is a diagram showing the operation of the sorting network for a cascaded seven-level converter.
Figure 11:
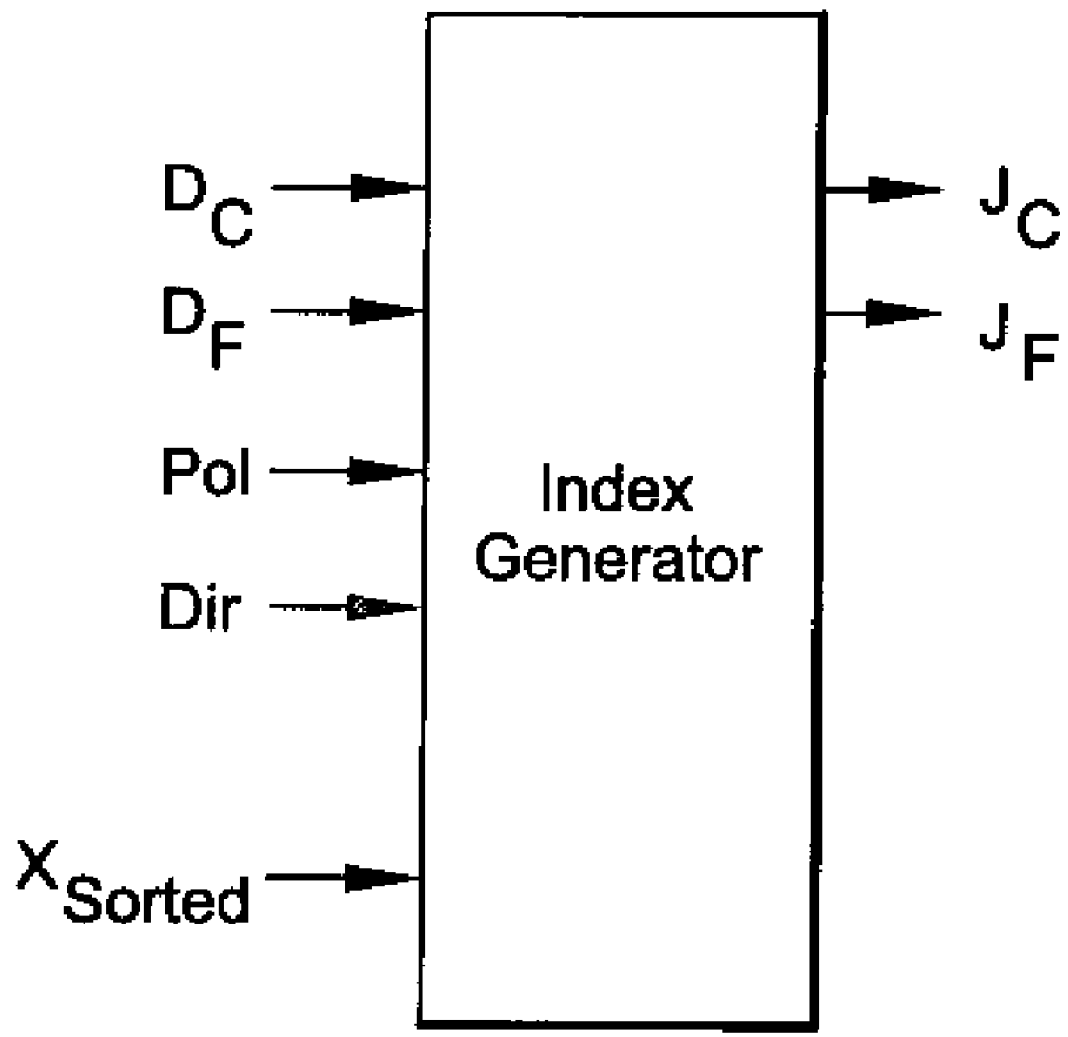
FIG. 11 is a diagram of the index generator block of FIG. 1, showing the inputs and outputs.

Referring now to FIG. 10, the proposed sorting network operation is demonstrated. The SN reads the voltage contents of the capacitor voltages of phase A of a cascaded seven-level converter-based STATCOM. Then, the embedded indices are assigned and are passed through the sorting algorithm. After three clock cycles, the sorted result is achieved, and the register $X_{sorted}$ can be accessed by the other function blocks.

For Dir=0 and Pol=1, $D_c$ H-bridge converters whose DC capacitor voltages are the highest are used to generate the positive output voltage. In contrast, for Dir=1 and Pol=1, $D_c$ H-bridge converters whose DC capacitor voltages are the lowest are used to generate positive output voltage. In the case of Pol=0, for Dir=0, $D_c$ H-bridge converters whose DC capacitor voltages are the highest are used to generate the negative output voltage. In contrast, for Dir=1 and Pol=0, $D_c$ H-bridge converters whose DC capacitor voltages are the lowest are used to generate the negative output voltage. Based on this logic, Dir indicates whether the H-bridge converters with the highest or lowest DC voltages are used to synthesize the output voltage. When Dir=1, the IG performs the summation of the $X_{sorted}$ contents from the left to the right-hand side and from the right to the left-hand side when Dir=0. Parameter $Inx_L$ contains the summation result. The direction of the summation is illustrated in FIG. 12(a). The following algorithm is used as an example for the case of the ceiling parameter, $D_c$:

if Dir=1

$$Inx_L = \sum_{i=1}^{D_c} X_{sorted}[i]$$

else $$Inx_L = \sum_{i=(N+1)-D_c}^{N} X_{sorted}[i],$$

and the final format of the IG output is shown in FIG. 12(b).

After achieving the ready signal from the IG, the indices $J_C$ and $J_F$ are used to point to the desirable switching signals for all main semiconductor devices. Table 1, below, is an example for the seven-level cascaded converter case.

TABLE 1

| Pol | $Inx_L$ | Hex | $S_{A31}, S_{A32}$ | $S_{A21}, S_{A22}$ | $S_{A11}, S_{A12}$ |
|---|---|---|---|---|---|
| 0 | 0 | 0000 | 0,0 | 0,0 | 0,0 |
| 0 | 1 | 0001 | 0,0 | 0,0 | 1,0 |
| 0 | 2 | 0010 | 1,1 | 1,0 | 0,0 |
| 0 | 3 | 0011 | 1,1 | 1,0 | 1,0 |
| 0 | 4 | 0100 | 1,0 | 1,1 | 1,1 |
| 0 | 5 | 0101 | 1,0 | 1,1 | 1,0 |
| 0 | 6 | 0110 | 1,0 | 1,0 | 1,1 |
| 0 | 7 | 0111 | 1,0 | 1,0 | 1,0 |
| 1 | 0 | 0000 | 0,0 | 0,0 | 0,0 |
| 1 | 1 | 0001 | 0,0 | 0,0 | 01 |
| 1 | 2 | 0010 | 1,1 | 0,1 | 0,0 |
| 1 | 3 | 0011 | 1,1 | 0,1 | 0,1 |
| 1 | 4 | 0100 | 0,1 | 1,1 | 1,1 |
| 1 | 5 | 0101 | 0,1 | 1,1 | 0,1 |
| 1 | 6 | 0110 | 0,1 | 0,1 | 1,1 |
| 1 | 7 | 0111 | 0,1 | 0,1 | 0,1 |

Table 1 includes the index (the first and second columns), corresponding hex (the third column), and the status of the top switches of the level-3 H-bridge converter (the fourth column), the level-2 H-bridge converter (the fifth column), and the level-1 H-bridge converter (the sixth column). The 0 and 1 in the fourth though sixth columns represent the top switches turned off and on, respectively. Due to complementary switching, the top and bottom switching status are derived from the four possible combinations of the two top switches shown in Table 2, below:

TABLE 2

| $S_{A1}, S_{A2}$ | $S_{A1}$ | $S_{A2}$ | $S_{A3}$ | $S_{A4}$ |
|---|---|---|---|---|
| 0,0 | 0 | 0 | 1 | 1 |
| 0,1 | 0 | 1 | 1 | 0 |
| 1,0 | 1 | 0 | 0 | 1 |
| 1,1 | 1 | 1 | 0 | 0 |

Figure 13:
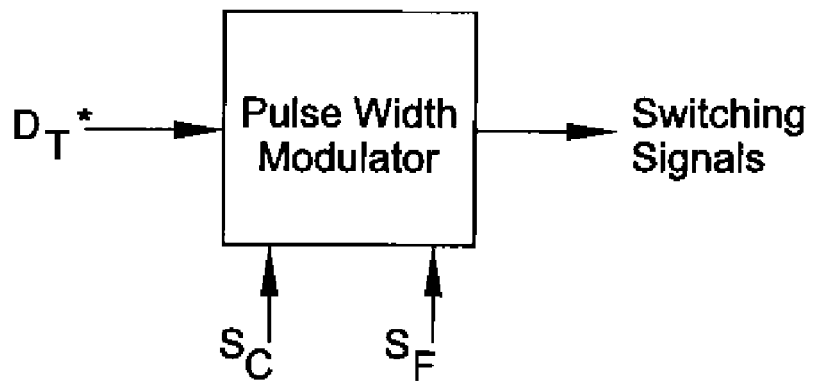
FIG. 13 is a diagram of the PWM block of FIG. 1, showing the inputs and output.

The PWM transforms the average switching function of the duty cycle into the two-stage switching action for the individual switch. The inputs and output of the PWM are shown in FIG. 13. Due to the relatively slow switching rate of high-power semiconductor devices, the double-updated PWM shown in FIG. 14 is employed to minimize the delay time.

Figure 14:
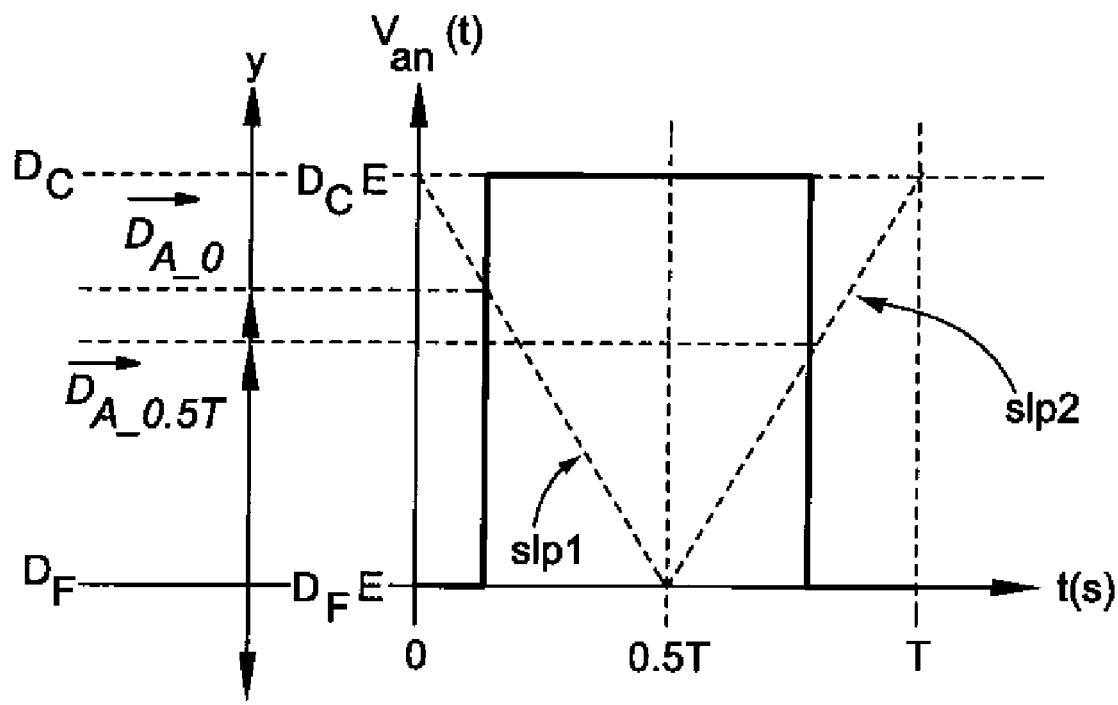
FIG. 14 is a diagram showing a PWM waveform as synthesized by a PWM of the type shown in FIG. 13.

FIG. 14 illustrates the PWM waveform of the phase-A voltage generated from the given seven-level duty cycle command between time 0 and T, where T is the switching period. The PWM reads the duty cycle commands twice every switching cycle at 0 and 0.5T, in order to generate the waveforms in the 0–0.5T and the 0.5T–T durations, respectively.

EXAMPLE 1

A general PWM waveform synthesized by the proposed PWM, as shown in FIG. 14, is described and explained by way of example. In the period between T and 1.5T s, the duty cycle $\vec{D}_{A\_T}$ is read. The switching signals corresponding to the index $\vec{J}_F$ are sent to the main switches. At the moment that the negative slope slp1 intersects $\vec{D}_{A\_T}$, the main switches are switched to the switching signals corresponding to the index $J_C$. In the second half-cycle, the duty cycle is updated to $\vec{D}_{A\_0.5T}$. The status of the main switches is, however, still unchanged. Until the moment at which the positive slope slp2 intersects $\vec{D}_{A\_0.5T}$, the main switches are switched back to the switching signals corresponding to the index $J_F$. This completes a switching cycle.

To illustrate the performance of the cascaded PWM technique, a single-phase, seven-level cascaded-based STATCOM with the DSP-based controller is set up and tested in a small-scale test bed.

EXAMPLE 2

DC Voltage-Balancing During Transient

Figure 15:
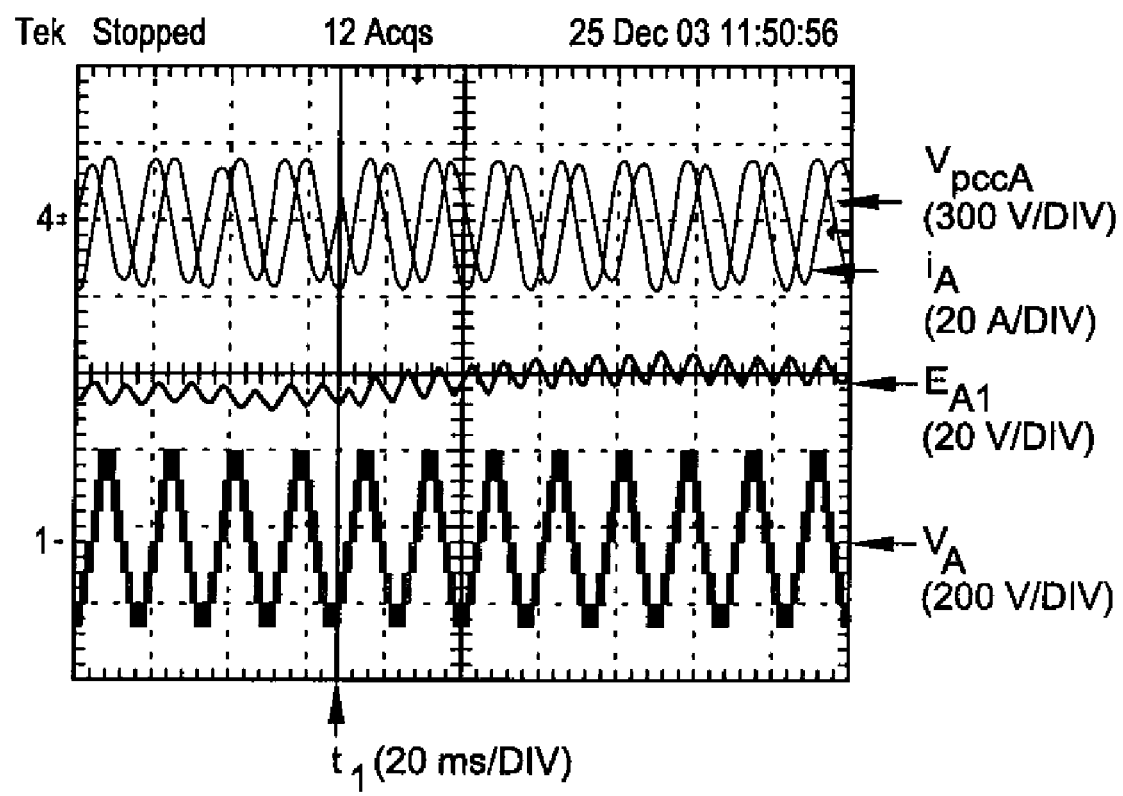
FIG. 15 is a waveform plot showing the transient from a full inductive to a full capacitive mode of a single-phase, seven-level cascaded STATCOM with a DSP-based controller according to an embodiment of the invention.

In this experiment, the STATCOM operates in the worst-case transient, which is either from the full capacitive to full inductive mode or vice versa. From the experimental results as shown in FIG. 15. At time $t_1$ the STATCOM is commanded to abruptly transfer from the full inductive to the full capacitive mode. Before time $t_1$, the output current $i_A$, which is leading the voltage at the PCC, $V_{pccA}$, by 90°, indicates that the STATCOM operates in the inductive mode, while the output current $i_A$ lagging $V_{pccA}$ by 90° after time $t_1$ indicates that the STATCOM operates in the capacitive mode. The result shows the fast response of $i_A$ to the step command. During the full capacitive mode, the 120 Hz voltage ripple across the DC capacitor is at its maximum, which is approximately 7 $V_{peak-to-peak}$ or 10% of the DC voltage setting of 70 V, and which is consistent with the $E_{A1}$ waveform, as shown in FIG. 15. Since three H-bridge converters are used in one phase leg, the output voltage $V_A$ then has seven levels. Although, a lower individual switching frequency of 333 Hz is used, the same current-loop bandwidth as that of 1 kHz in the three-level case can be achieved.

FIG. 16A shows the response of the three DC capacitor voltages of the seven-level cascaded converter during the same transient at time $t_2$, which is from the full inductive to full capacitive mode. The results show that these three DC capacitor voltages, $E_{A1}$ through $E_{A3}$, are very well regulated to the setting value in the steady state. As shown in FIG. 16B $E_{A1}$ through $E_{A3}$ are aligned with the same reference in order to show their balance. The results indicate that all three voltages have the same voltage ripple and are very well balanced in both the steady state and the transient. Again, the maximum peak-to-peak voltage ripples across the DC capacitors are about 7 V during the full capacitive operation mode.

EXAMPLE 3

DC Voltage-Balancing During Capacitor Disturbation

Figure 17:
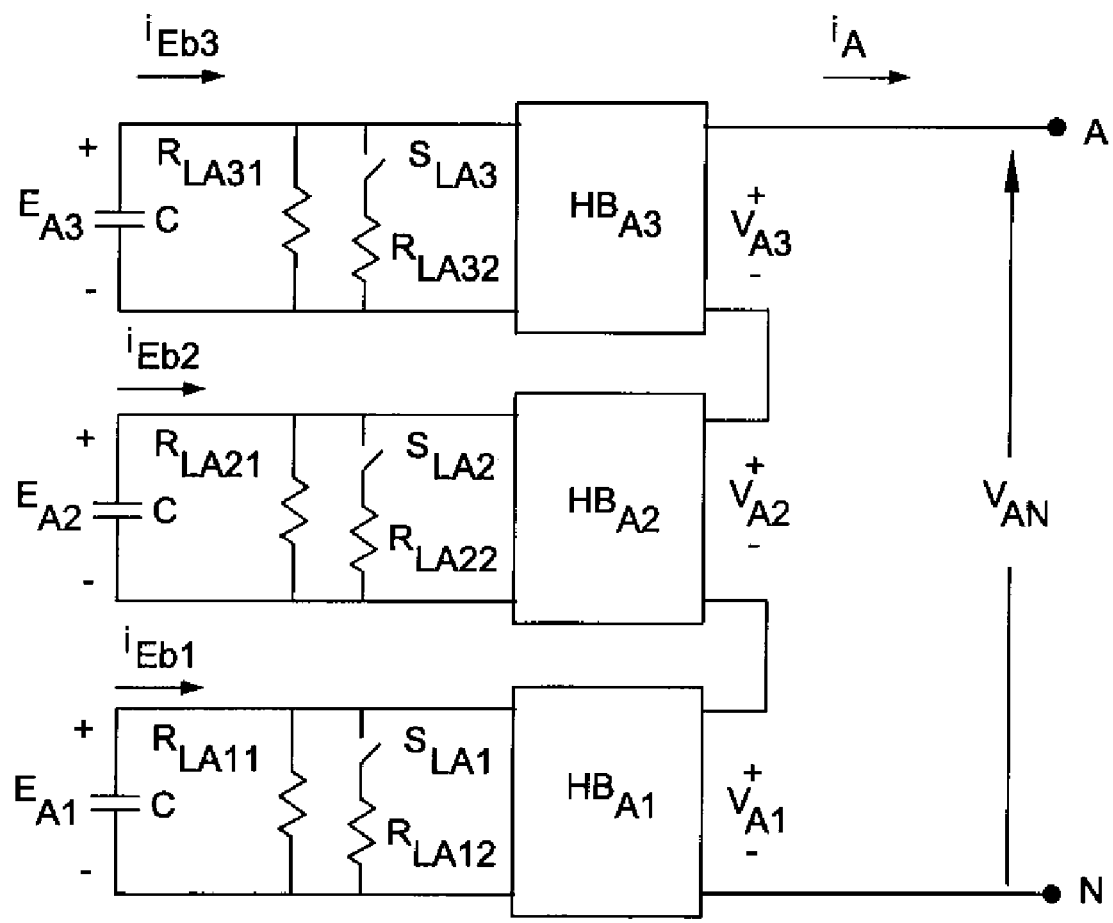
FIG. 17 is a block diagram illustrating a method of verifying the cascaded PWM according to a preferred embodiment of the invention.

To further verify the performance of the proposed cascaded PWM technique, phase A of the seven-level cascaded converter is set up as shown in FIG. 17. A set of resistors is paralleled with the DC capacitors and represent the additional losses of the H-bridge converters. The semiconductor switches $S_{LA1}$ through $S_{LA3}$ are used to control the resistance across the DC capacitors. With the combination of these three switches, several different resistances across the DC capacitors can be effected during different STATCOM operation modes.

Figure 18:
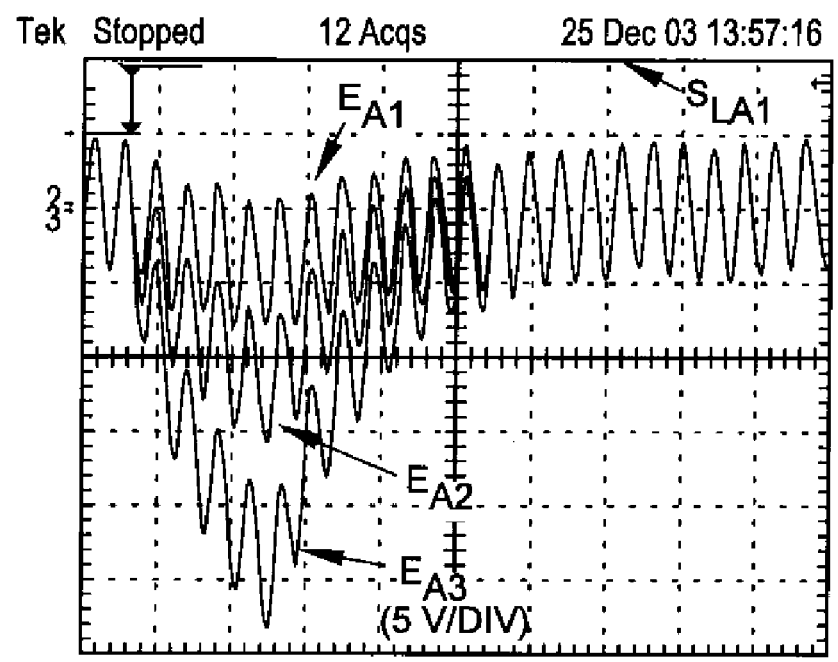
FIG. 18 is a plot showing capacitor voltage waveform response to a disturbance at the rising edge of a first semiconductor switch of FIG. 17.

In the first case, the full-capacitive mode, the losses of all three H-bridge converters are increased by connecting three different resistors in parallel with Hie DC-bus capacitors. The response of the three DC capacitors voltages, $E_{A1}$ through $E_{A3}$, to the disturbance at the DC links is shown in FIG. 18. The rising edge of the $S_{LA1}$ gate signal indicates the beginning of the DC-capacitor voltage disturbance. Because it is connected to the largest resistance, the DC capacitor of the third-level H-bridge converter has the lowest voltage. All voltages are initially decreasing because the amounts of compensated currents are less than the discharge currents. All three DC capacitor voltages are increased with the help of the feedback voltage loop and the cascaded PWM, and can convert to the setting voltage, which is 70 V in this experiment.

Figure 19:
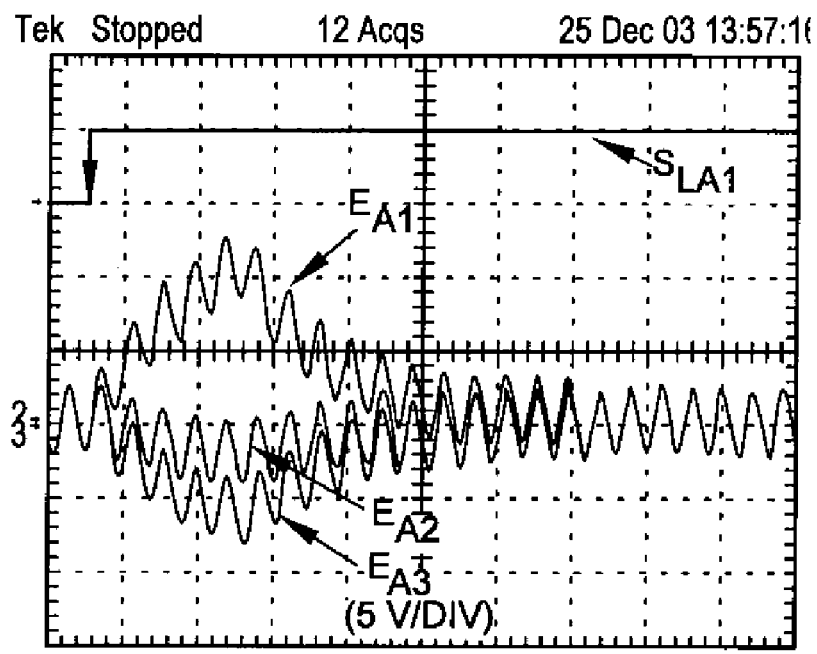
FIG. 19 is a plot showing capacitor voltage waveform response to a disturbance at the rising edge of a second semiconductor switch of FIG. 17.

In the second case, the STATCOM operates in the full-capacitive mode, the losses in the second and third-level H-bridge converters are increased, and the losses in the first-level H-bridge converter are decreased by turning on $S_{LA2}$ and $S_{LA3}$ and turning off $S_{LA1}$, respectively. The response of the three DC capacitors voltages, $E_{A1}$ through $E_{A3}$, to the disturbance at the DC links is shown in FIG. 19. The rising edge of the $S_{LA2}$ gate signal indicates the beginning of the DC-capacitor voltage disturbance. After the disturbance, the DC-capacitor voltage of the first-level H-bridge converter increases due to the over-compensated current, while the other two are decreased due to the additional losses. The third-level DC-capacitor voltage drops further than that of the second-level one because of the larger paralleled resistor. With the help of the feedback voltage loop and the cascaded PWM, all three DC capacitor voltages are again increased, and can convert to the setting voltage.

In conclusion, the DC-capacitor voltage imbalance in three different levels of the seven-level cascaded converter caused by the severe and unusual disturbance presented in both examples explained above, can be eliminated by utilizing the PWM technique and feedback voltage-loop control described in this application. As noted above, this technique can also be applied in the CMC topology with any number of voltage levels.

A novel pulse width modulation method and circuit for balancing the voltage of DC links of a cascaded-multilevel converter for reactive power compensations is described above. Various details of the invention may be changed without departing from the scope of the invention. Furthermore, the foregoing description of the preferred embodiment of the invention and best mode for practicing the invention are provided for the purpose of illustration only and not for the purpose of limitation, the invention being defined by the claims.

We claim:

1. A method of balancing the voltage of DC links in a cascaded multi-level converter (CMC) semiconductor circuit, comprising the steps of:
   (a) providing a plurality of H-bridge converters in the CMC circuit;
   (b) utilizing a three phase duty cycle value from the main controller to determine a normalized duty cycle value, a ceiling duty cycle value and a floor duty cycle value;
   (c) utilizing the normalized duty cycle value and an output current of the CMC to determine the direction and polarity of a capacitor current, and utilizing the capacitor current to determine a plurality of output capacitor voltages;
   (d) sorting the capacitor voltages to obtain a register representing sorted capacitor voltages;
   (e) inputting the multi-level duty cycle voltage, the polarity of the duty cycle output voltage and the sorted capacitor voltages into an index generator;
   (f) calculating a ceiling index pointer and a floor index pointer wherein the ceiling index pointer corresponds to an input ceiling duty cycle representing a number of the plurality of H-bridge converters required to generate a positive output voltage, and the floor index pointer corresponds to an input floor duty cycle representing a number of the plurality of H-bridge converters required to generate a negative output voltage;
   (g) determining a voltage summation result and direction from the ceiling index pointer and a floor index pointer;
   (h) utilizing the voltage summation result, direction from the ceiling index pointer and a floor index pointer to create a combined switching table for the H-bridge converters; and
   (i) utilizing a pulse width modulator to balance the voltage of the DC links and thereby eliminate DC-capacitor voltage imbalance.

2. A method according to claim 1, and including the step of determining the number of levels in the CMC is determined according to the formula 2N+1, where N is the number of H-bridge converters per phase in the CMC.

3. A method according to claim 1, wherein the step of sorting the capacitor voltages comprises the step of sorting the capacitor voltages with a sorting algorithm.

4. A method according to claim 3, wherein the algorithm is a bubble sorting algorithm.

5. A method according to claim 1, wherein the CMC comprises a cascaded seven level voltage source converter (VSC).

6. A method of balancing the voltage of DC links in a cascaded multi-level converter (CMC) semiconductor circuit, comprising the steps of:
   (a) providing a plurality of H-bridge converters in the CMC circuit;
   (b) utilizing a three phase command multilevel duty cycle value from the main controller to determine a normalized duty cycle value, a ceiling duty cycle value and a floor duty cycle value;
   (c) utilizing the normalized duty cycle value and an output current of the CMC to determine the direction and polarity of the normalized duty cycle value and a capacitor current, and utilizing the capacitor current to determine a plurality of output capacitor voltages;
   (d) sorting the capacitor voltages to obtain a register containing a plurality of indices representing sorted capacitor voltages;
   (e) inputting the multi-level duty cycle voltage, the direction and polarity of the duty cycle output voltage and the sorted capacitor voltages into an index generator;
   (f) calculating a ceiling index pointer and a floor index pointer wherein the ceiling index pointer corresponds to an input ceiling duty cycle representing a number of the plurality of H-bridge converters required to generate a positive output voltage, and the floor index pointer corresponds to an input floor duty cycle representing a number of the plurality of H-bridge converters required to generate a negative output voltage;
   (g) determining a voltage summation result and direction from the ceiling index pointer and a floor index pointer;
   (h) utilizing the voltage summation result and direction from the ceiling index pointer and a floor index pointer to create a combined switching table for the H-bridge converters; and (i) utilizing a pulse width modulator to balance the voltage of the DC links and thereby eliminate DC-capacitor voltage imbalance.

7. A circuit for balancing the voltage of DC links in a cascaded multi-level converter (CMC), comprising:
   (a) a plurality of H-bridge converters;
   (b) a main controller for utilizing a three phase duty cycle value to determine a normalized duty cycle value, a ceiling duty cycle value and a floor duty cycle value;
   (c) a direction and duty cycle check circuit utilizing the normalized duty cycle value and an output current of the CMC to determine the direction and polarity of a capacitor current, and utilizing the capacitor current to determine a plurality of output capacitor voltages;
   (d) a sorting network circuit for sorting the capacitor voltages to obtain a register representing sorted capacitor voltages;
   (e) an index generator for receiving the multi-level duty cycle voltage, the polarity of the duty cycle output voltage and the sorted capacitor voltages and calculating a ceiling index pointer and a floor index pointer wherein the ceiling index pointer corresponds to an input ceiling duty cycle representing a number of the plurality of H-bridge converters required to generate a positive output voltage, and the floor index pointer corresponds to an input floor duty cycle representing a number of the plurality of H-bridge converters required to generate a negative output voltage, determining therefrom a voltage summation result and direction from the ceiling index pointer and a floor index pointer, and utilizing the voltage summation result, direction from the ceiling index pointer and a floor index pointer to create a combined switching table for the H-bridge converters; and
   (f) utilizing a pulse width modulator to balance the voltage of the DC links and thereby eliminate DC-capacitor voltage imbalance.

8. A circuit according to claim 7, wherein the circuit comprises a field programmable gate array circuit (FPGA).

9. A circuit according to claim 7, wherein the number of levels in the CMC is equal to the number obtained using the formula $2N+1$, where N is the number of H-bridge converters per phase in the CMC.

10. A circuit according to claim 7, wherein the sorting network includes a sorting algorithm.

11. A circuit according to claim 10, wherein the sorting algorithm comprises a bubble sorting algorithm.

12. A circuit according to claim 7, wherein the CMC comprises a cascaded seven level voltage source converter (VSC).

* * * * *